(12) United States Patent
Chembrolu et al.

(10) Patent No.: US 9,099,110 B1
(45) Date of Patent: Aug. 4, 2015

(54) REAL TIME WRITER SHIELDS MAGNETIZATION OPTIMIZATION FOR FTI IMPROVEMENT

(71) Applicant: HGST Netherlands B.V., Amsterdam (NL)

(72) Inventors: Venkatesh Chembrolu, San Jose, CA (US); Wen-Chien David Hsiao, San Jose, CA (US); Quan-Chiu Harry Lam, San Jose, CA (US); Supradeep Narayana, Santa Clara, CA (US)

(73) Assignee: HGST NETHERLANDS, B.V., Amsterdam (NL)

( * ) Notice: Subject to any disclaimer, the term of this patent is extended or adjusted under 35 U.S.C. 154(b) by 0 days.

(21) Appl. No.: 14/332,137

(22) Filed: Jul. 15, 2014

(51) Int. Cl.
*G11B 5/31* (2006.01)
(52) U.S. Cl.
CPC ..................................... *G11B 5/3123* (2013.01)
(58) Field of Classification Search
CPC ... G11B 5/3146; G11B 5/1278; G11B 5/3116
USPC ............ 360/123.11, 123.06, 123.05, 125.01, 360/125.02, 125.04
See application file for complete search history.

(56) References Cited

U.S. PATENT DOCUMENTS

| | | | |
|---|---|---|---|
| 4,748,525 A * | 5/1988 | Perlov | 360/110 |
| 7,031,108 B2 * | 4/2006 | Mochizuki et al. | 360/123.06 |
| 8,035,930 B2 | 10/2011 | Takano et al. | |
| 8,169,730 B2 | 5/2012 | Cheng et al. | |
| 8,189,293 B1 | 5/2012 | Wakabayashi et al. | |
| 8,228,627 B2 * | 7/2012 | Koizumi et al. | 360/26 |
| 8,411,384 B2 | 4/2013 | Mochizuki et al. | |
| 8,416,529 B2 * | 4/2013 | Marshall | 360/125.3 |
| 8,537,496 B2 | 9/2013 | Li et al. | |
| 8,547,659 B1 * | 10/2013 | Bai et al. | 360/123.06 |
| 8,687,318 B2 * | 4/2014 | Meloche et al. | 360/123.05 |
| 2009/0034121 A1 * | 2/2009 | Ohta et al. | 360/125.02 |
| 2009/0080106 A1 * | 3/2009 | Shimizu et al. | 360/75 |
| 2009/0262464 A1 | 10/2009 | Gill et al. | |
| 2010/0157473 A1 * | 6/2010 | Fuchizaki et al. | 360/125.02 |
| 2010/0254041 A1 * | 10/2010 | Alex et al. | 360/123.02 |
| 2010/0254042 A1 * | 10/2010 | Contreras et al. | 360/123.05 |
| 2011/0051288 A1 * | 3/2011 | Contreras et al. | 360/234.3 |
| 2013/0329319 A1 * | 12/2013 | Sasaki et al. | 360/123.12 |
| 2014/0177099 A1 * | 6/2014 | Sasaki et al. | 360/123.12 |

OTHER PUBLICATIONS

Yue Liu; et al., "Characterization of Skip or Far Track Erasure in a Side Shield Design"; IEEE Transactions on Magnetics, vol. 45, No. 10, Oct. 2009.

* cited by examiner

*Primary Examiner* — Angel Castro
(74) *Attorney, Agent, or Firm* — Patterson & Sheridan, LLP

(57) ABSTRACT

Embodiments disclosed herein generally relate to a magnetic write head. The magnetic write head includes a write pole, a shield and a first coil disposed around the write pole. The magnetic write head further includes a magnetic circuit and the magnetic circuit includes a loop of magnetic material and a second coil disposed around the loop of magnetic material. The magnetic circuit magnetically resets the shield to improve far track interference.

20 Claims, 4 Drawing Sheets

REAL TIME WRITER SHIELDS MAGNETIZATION OPTIMIZATION FOR FTI IMPROVEMENT

BACKGROUND

1. Field

Embodiments disclosed herein generally relate to a magnetic write head for use in a hard disk drive.

2. Description of the Related Art

The heart of a computer is a magnetic disk drive which typically includes a rotating magnetic media, such as a disk, a slider that has read and write heads, a suspension arm above the rotating disk and an actuator arm that swings the suspension arm to place the read and/or write heads over selected tracks on the rotating disk. The suspension arm biases the slider towards the surface of the disk when the disk is not rotating but, when the disk rotates, air is swirled by the rotating disk adjacent a media facing surface (MFS), such as an air bearing surface (ABS) of the slider, causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In a perpendicular magnetic recording system, the magnetic media has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where the magnetic flux is sufficiently spread out and weak that the signal recorded by the write pole is not erased.

During the writing operations, which is a dynamic process, the write field generated not only records on the track of interest but also on the adjacent tracks leading to data erasure. This erasure is often due to inadequate shielding or improper magnetization direction of the shields during the writing process. In a controlled experiment, a very high percentage of the hard disk drives that failed for far track interference (FTI) were found to have the magnetization direction in the trailing shield reversed of what is normally expected. Slider level initiation may help, but it is very difficult to implement in production. In addition, even if sliders are initialized, domains in the shields can still change after building heads into hard disk drives.

Therefore, an improved magnetic write head is needed.

SUMMARY

Embodiments disclosed herein generally relate to a magnetic write head. The magnetic write head includes a write pole, a shield and a first coil disposed around the write pole. The magnetic write head further includes a magnetic circuit and the magnetic circuit includes a loop of magnetic material and a second coil disposed around the loop of magnetic material. The magnetic circuit magnetically resets the shield to improve far track interference.

In one embodiment, a magnetic write head is disclosed. The magnetic write head includes a write pole extending to a media facing surface, a shield disposed around the write pole at the media facing surface, a first coil disposed around the write pole, and a magnetic circuit coupled to the shield. The magnetic circuit includes a loop of magnetic material and a second coil disposed around the loop.

In another embodiment, a magnetic write head is disclosed. The magnetic write head includes a first return pole, a second return pole, and the second return pole includes a surface facing the first return pole. The magnetic write head further includes a write pole disposed between the first and second return poles, and the write pole extends to a media facing surface. The magnetic write head further includes a first coil disposed between the first return pole and the second return pole, and a magnetic circuit coupled to a shield. The magnetic circuit includes a loop of magnetic material and a second coil disposed around the loop.

In another embodiment, a hard disk drive is disclosed. The hard disk drive includes a magnetic media, a magnetic read head and a magnetic write head. The magnetic write head includes a write pole extending to a media facing surface, a shield disposed around the write pole at the media facing surface, a first coil disposed around the write pole, and a magnetic circuit coupled to the shield. The magnetic circuit has a loop of magnetic material and a second coil disposed around the loop.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the invention is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a magnetic write head. The magnetic write head includes a write pole, a shield and a first coil disposed around the write pole. The magnetic write head further includes a magnetic circuit and the magnetic circuit includes a loop of magnetic material and a second coil disposed around the loop of magnetic material. The magnetic circuit magnetically resets the shield to improve far track interference.

Figure 1:
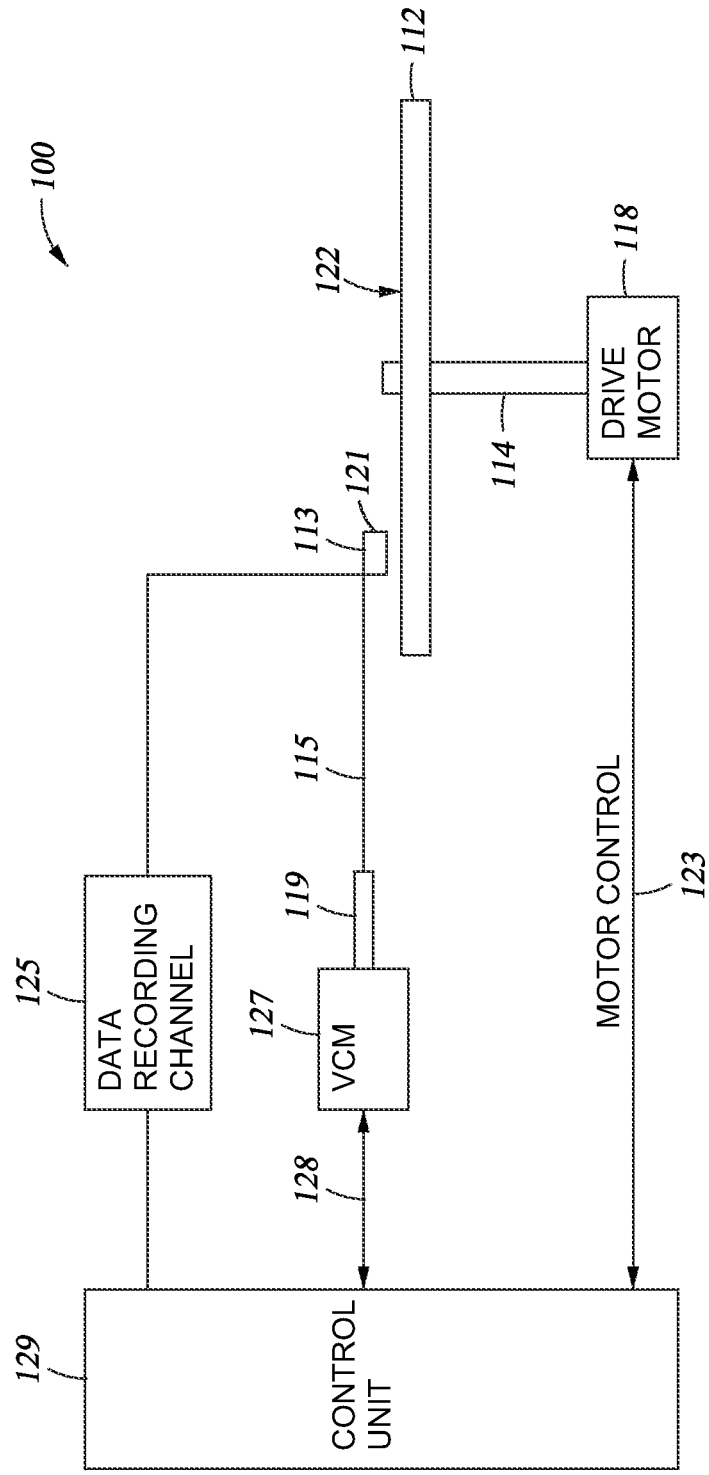
FIG. 1 illustrates an exemplary magnetic disk drive according to embodiments disclosed herein.

FIG. 1 illustrates a disk drive 100 according to embodiments described herein. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation.

The various components of the disk storage system are controlled in operation by control signals generated by control unit 129, such as access control signals and internal clock signals. Typically, the control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
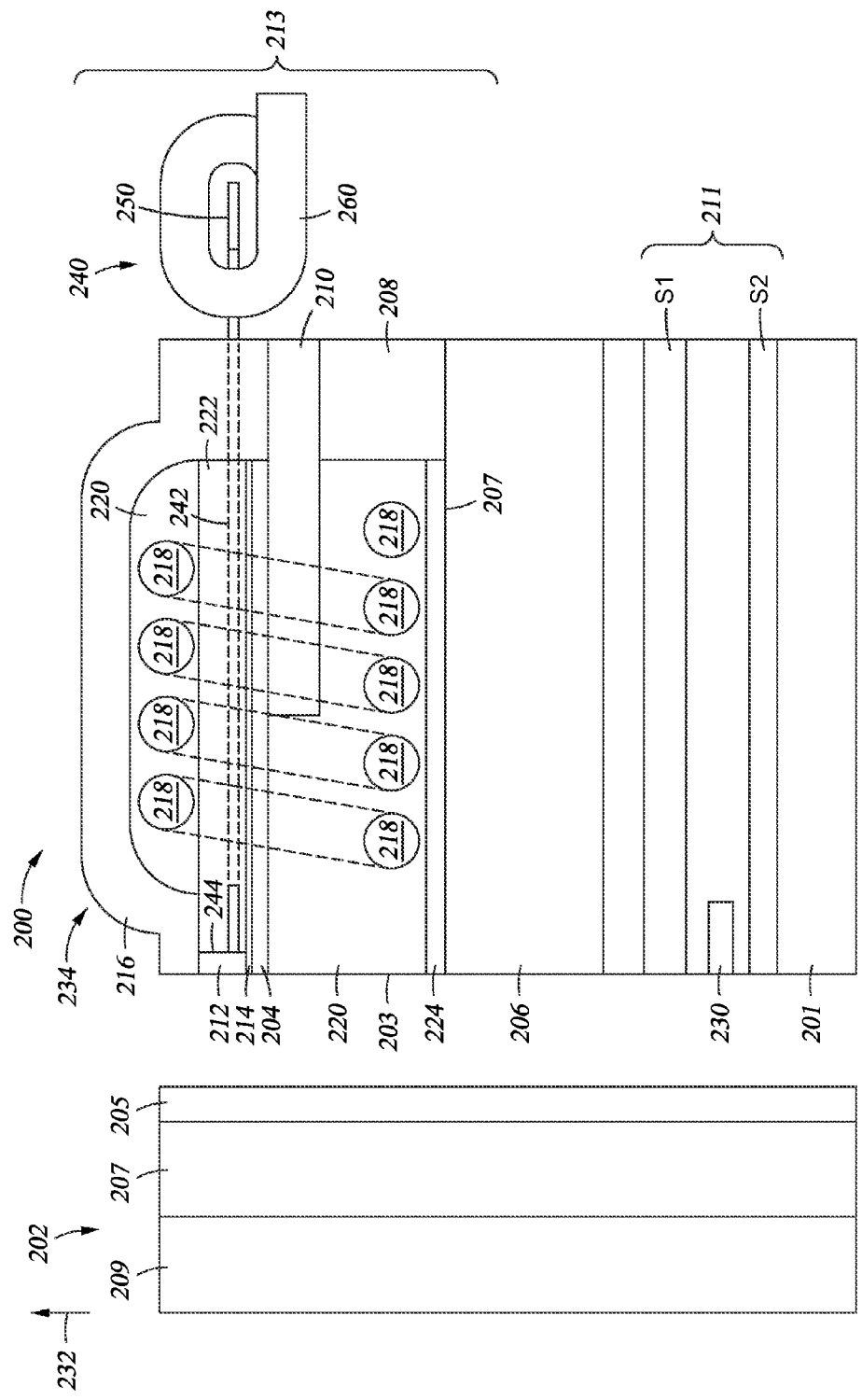
FIG. 2 is a cross sectional side view of a read/write head according to one embodiment disclosed herein.

FIG. 2 is a fragmented, cross sectional side view through the center of a read/write head 200 fabricated on a slider body 201 and facing a magnetic disk 202. The read/write head 200 and magnetic disk 202 may correspond to the magnetic assembly 121 and magnetic disk 112, respectively in FIG. 1. In some embodiments, the magnetic disk 202 may be a "dual-layer" medium that includes a perpendicular magnetic data recording layer (RL) 205 on a "soft" or relatively low-coercivity magnetically permeable underlayer (PL) 207 formed on a disk substrate 209. The read/write head 200 includes a MFS 203, such as an ABS, a magnetic write head 213 and a magnetic read head 211, and is mounted such that the MFS 203 is facing the magnetic disk 202. In FIG. 2, the disk 202 moves past the write head 213 in the direction indicated by the arrow 232, so the portion of slider body 201 that supports the read/write head 200 is often called the slider "trailing" end 234.

In some embodiments, the magnetic read head 211 is a magnetoresistive (MR) read head that includes an MR sensing element 230 located between MR shields S1 and S2. In other embodiments, the magnetic read head 211 is a magnetic tunnel junction (MTJ) read head that includes a MTJ sensing device 230 located between MR shields S1 and S2. The magnetic fields of the adjacent magnetized regions in the magnetic disk 202 are detectable by the MR (or MTJ) sensing element 230 as the recorded bits.

The write head 213 includes a write pole 204, a first return pole 216 and a second return pole 206. The write pole 204 may be disposed between the first return pole 216 and the second return pole 206 and the second return pole 206 has a surface 207 that is facing the first return pole 216. A magnetic back gap layer 208 and magnetic shaping layer 210 may magnetically connect the second return pole 206 with the write pole 204 at a location that is recessed from the MFS 203. An electronically conductive, non-magnetic write coil 218 may be disposed between the first return pole 216 and the second return pole 206, and may be disposed around the write pole 204. The write coil 218 may be made of Cu. The coil 218 may be disposed on an insulation layer 224 and can be embedded in a non-magnetic, electrically insulating material 220 such as alumina and/or hard baked photoresist.

During operation, an electrical current flowing through the coil 218 induces a magnetic field that results in a magnetic flux flowing through the write pole 204. This causes a magnetic field to be emitted from the write pole 204 toward the magnetic disk 202. This magnetic write field flows through the disk to return to the second return pole 206 and the first return pole 216.

In order to increase the write field gradient, the write head 213 also includes a magnetic trailing shield 212. The trailing shield 212 may be a magnetic material such as Ni, Co and/or Fe alloys. The trailing shield 212 may be separated from the write pole 204 by a non-magnetic trailing gap layer 214. A non-magnetic, electrically insulating material 222 may be disposed adjacent the trailing shield 212 and over the trailing gap layer 214. The trailing shield 212 may be connected to the first return pole 216, which is also connected to the shaping layer 210 at a location recessed from the MFS 203.

Figure 3:
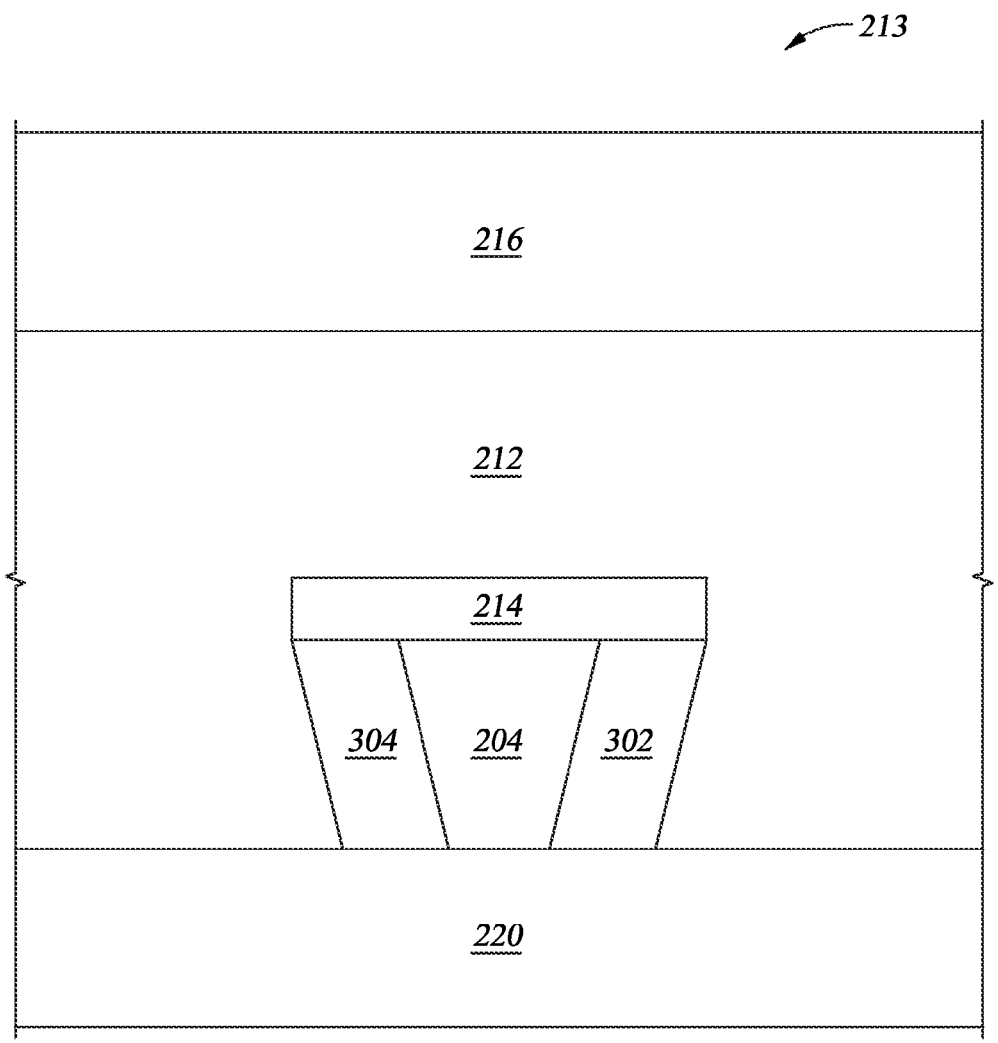
FIG. 3 is a media facing surface view of a write head according to one embodiment disclosed herein.

FIG. 3 is a MFS view of the write head 213 according to one embodiment disclosed herein. The trailing shield 212 may wrap-around the write pole 204, thus the trailing shield 212 may be referred to as wrap-around shield (WAS). Non-magnetic side gap layers 302, 304 may be formed on the sides of the write pole 204. The magnetization direction of the trailing shield 212 may end up being in the unfavorable direction (usually the opposite of what it is expected to be), which may cause hard disk failure due to high FTI. In order to magnetically reset the magnetization direction of the trailing shield 212, a separate magnetic circuit may be utilized. When a hard disk drive has failed due to high FTI, the magnetization direction of WAS is in a first direction. Resetting the magnetization direction of the WAS means to orient the magnetization direction of WAS in a second direction that is opposite the first direction, which in turn reduces FTI.

Referring back to FIG. 2, a magnetic circuit 240 is added to the write head 213 to reduce FTI. The magnetic circuit 240 includes a loop of magnetic material 250 and a coil 260. The loop of magnetic material 250 may be made of the same material as the trailing shield 212. In one embodiment, both the trailing shield 212 and the loop of magnetic material 250 are made of NiFe alloy. The coil 260 may be made of the same material as the write coil 218. In one embodiment, the coil 260 is made of Cu. The coil 260 may have one or more turns. As shown in FIG. 2, the loop 250 may form a plane 242 that is substantially parallel to the surface 207 of the second return pole 206. The loop 250 may be recessed from the MFS 203. In one embodiment, the loop 250 is in contact with a surface 244 of the trailing shield 212, and the surface 244 is opposite the MFS 203.

Figure 4:
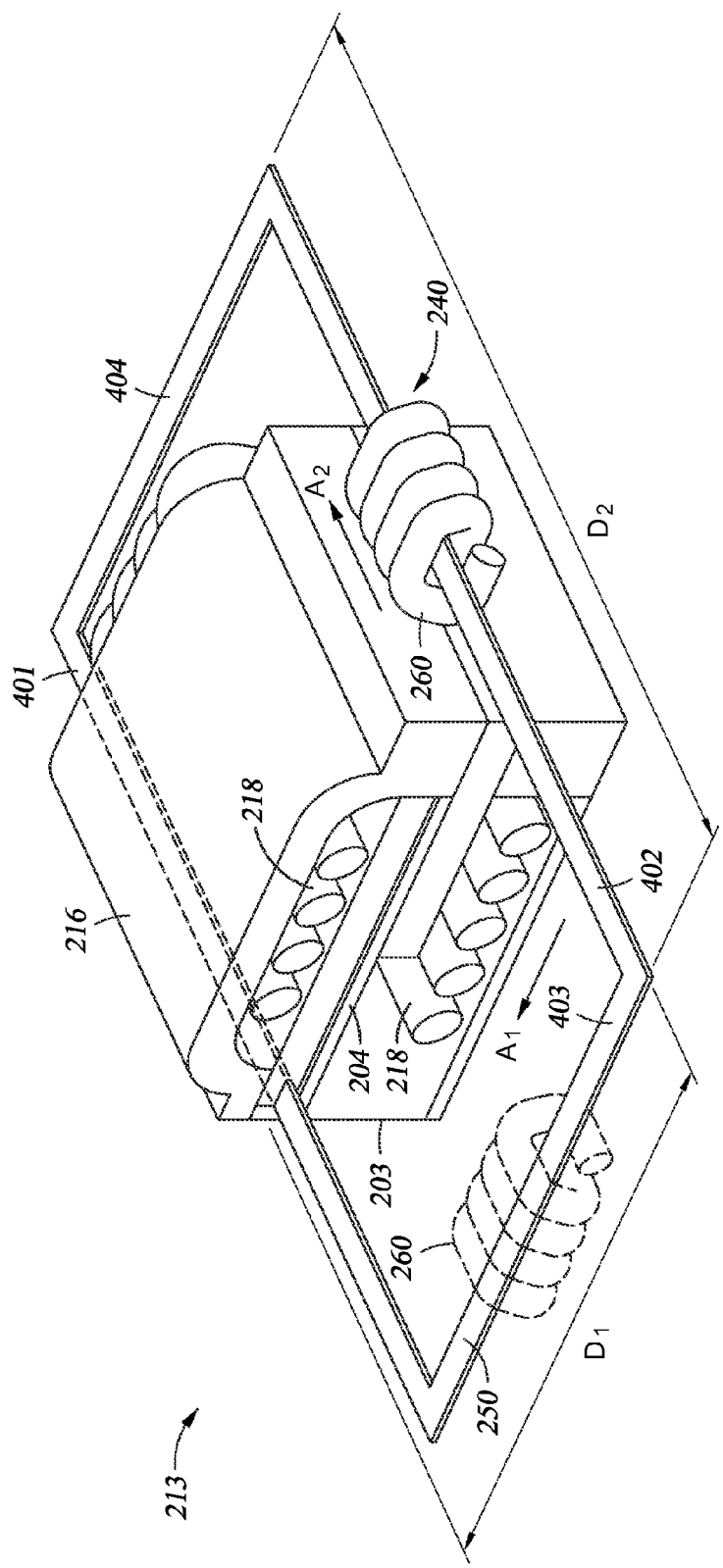
FIG. 4 is a perspective view of the write head according to one embodiment disclosed herein.

FIG. 4 is a perspective view of the write head 213 according to one embodiment disclosed herein. A portion of the coil 218 is removed for better clarity. As shown in FIG. 4, the loop 250 extends from a location that is less recessed from the MFS 203 to a location that is more recessed from the MFS 203. In the embodiment shown in FIG. 4, the loop 250 has a rectangular shape and has sides 401, 402, 403, 404 where the side 401 is substantially parallel to the side 402 and the side 403 is substantially parallel to the side 404. The loop 250 may be circular or any other suitable shape. The coil 260 may be disposed around the side 402 and may be a distance "D1" away from the MFS 203. The distance "D1" can be about 15 microns. In the embodiment where the loop 250 is rectangular, sides 401, 402 are substantially parallel to the MFS 203 and sides 401, 402 may have a length "D2" that may be greater than the width of the return pole 216 and can range between about 20 to about 50 microns. The write coil 218 may have an axial direction, indicated as "A1." The coil 260, when disposed around the side 402, may have an axial direction, indicated as "A2" and the axial direction "A2" may be substantially perpendicular to the axial direction "A1." In one embodiment, the coil 260 is disposed around the side 403 (shown in dotted lines) and also has the axial direction "A1." The coil 260 may be disposed around the side 404.

When a hard disk drive, such as the hard disk drive 100, is having high FTI due to the magnetization in the trailing shield 212 being in the wrong direction, a current may be applied to the coil 260 which will produce a magnetic field to reset the magnetization direction of the trailing shield 212 in the FTI favorable direction without affecting the write operation. The current applied to the coil 260 can range from about 50 mA per turn to about 250 mA per turn, and the coil 260 may have one or more turns. The magnetic field generated in the trailing shield 212 will be strong enough to reverse the magnetization direction without affecting the writing magnetic field. Once the magnetization direction of the trailing shield 212 is reversed, the current applied to the coil 260 may be stopped, and the FTI will be reduced.

When magnetic field is generated in the writing coil 218, as shown in FIG. 2, the magnetization of the trailing shield 212 couples with this generated magnetic field. If the magnetization direction of the trailing shield 212 is in an unfavorable state to begin with, then more than expected flux will leak into the magnetic disk 202 (shown in FIG. 2) from the trailing shield 212 onto adjacent tracks, resulting in FTI. This excess flux leaking into the magnetic disk 202 is the cause of loss of data and data erasure. In order to reset the magnetization direction of the trailing shield 212, an additional magnetic circuit 240 is coupled to the trailing shield 212. The magnetic circuit 240 includes the loop of magnetic material 250 and the coil 260. The loop of magnetic material 250 is coupled to the trailing shield 212. The magnetic field for resetting the trailing shield 212 is generated by applying a current to the coil 260 of the magnetic circuit 240. The magnetic field generated in the loop of magnetic material 250 resets the magnetization direction of the trailing shield 212. The current may be applied to the coil 260 whenever there is high FTI, including during the writing process. At least one additional contact pad may be used for this design to be integrated with the slider 113.

In summary, a write head having a separate magnetic circuit for resetting the magnetization direction of the trailing shield is disclosed. The magnetic circuit includes a loop of magnetic material and a coil disposed around the loop. The coil may be disposed at a location that is recessed from the MFS and the writer coil may be between the coil of the magnetic circuit and the MFS. When applying a current to the coil of the magnetic circuit, a magnetic field is generated in the trailing shield to reset the magnetization direction of the trailing shield, resulting in reduced FTI.

While the foregoing is directed to embodiments of the disclosure, other and further embodiments may be devised without departing from the basic scope thereof, and the scope thereof is determined by the claims that follow.

What is claimed is:

1. A magnetic write head, comprising:
a write pole extending to a media facing surface;
a shield disposed around the write pole at the media facing surface;
a first return pole;
a second return pole, wherein the second return pole includes a surface facing the first return pole;
a first coil disposed around the write pole; and
a magnetic circuit coupled to the shield, wherein the magnetic circuit includes:
a loop of magnetic material, wherein the loop of magnetic material extends in a plane that is parallel to the surface the second return pole; and
a second coil disposed around the loop.

2. The magnetic write head of claim 1, wherein the shield comprises a magnetic material.

3. The magnetic write head of claim 2, wherein the shield further comprises Ni, Co and/or Fe alloys.

4. The magnetic write head of claim 1, wherein the loop of magnetic material comprises a same material as the shield.

5. The magnetic write head of claim 1, wherein the first coil has a first axial direction, the second coil has a second axial direction, and the first axial direction is substantially perpendicular to the second axial direction.

6. The magnetic write head of claim 1, wherein the loop of magnetic material is coupled to the shield.

7. The magnetic write head of claim 1, wherein the loop of magnetic material is rectangular.

8. The magnetic write head of claim 1, wherein the loop of magnetic material is recessed from the media facing surface.

9. The magnetic write head of claim 1, wherein the second coil is a distance away from the media facing surface.

10. A magnetic write head, comprising:
a first return pole;
a second return pole, wherein the second return pole includes a surface facing the first return pole;
a write pole disposed between the first and second return poles, wherein the write pole extends to a media facing surface;
a shield;
a first coil disposed between the first return pole and the second return pole; and
a magnetic circuit coupled to the shield, wherein the magnetic circuit includes:
a loop of magnetic material, wherein the loop of magnetic material extends in a plane that is parallel to the surface the second return pole; and
a second coil disposed around the loop.

11. The magnetic write head of claim 10, wherein the loop of magnetic material forms a plane that is substantially parallel to the surface of the second return pole.

12. The magnetic write head of claim 10, wherein the first coil has a first axial direction, the second coil has a second axial direction, and the first axial direction is substantially perpendicular to the second axial direction.

13. The magnetic write head of claim 10, wherein the first coil is disposed between the second coil and the media facing surface.

14. The magnetic write head of claim 13, wherein the second coil is a distance away from the media facing surface.

15. The magnetic write head of claim 10, wherein the loop of magnetic material comprises a same material as the shield.

16. The magnetic write head of claim 10, wherein the loop of magnetic material is coupled to the shield.

17. The magnetic write head of claim 10, wherein the loop of magnetic material is rectangular.

18. A hard disk drive, comprising:
a magnetic media;
a magnetic read head; and
a magnetic write head, wherein the magnetic write head includes:
  a write pole extending to a media facing surface;
  a shield disposed around the write pole at the media facing surface;
  a first return pole;
  a second return pole, wherein the second return pole includes a surface facing the first return pole;
  a first coil disposed around the write pole; and
  a magnetic circuit coupled to the shield, wherein the magnetic circuit has:
    a loop of magnetic material, wherein the loop of magnetic material extends in a plane that is parallel to the surface the second return pole; and
    a second coil disposed around the loop.

19. The hard disk drive of claim 18, wherein the loop of magnetic material is coupled to the shield.

20. The hard disk drive of claim 18, wherein the first coil is disposed between the second coil and the media facing surface.

* * * * *